United States Patent Office 3,491,048
Patented Jan. 20, 1970

3,491,048
SILICONE OIL MODIFIED OXYMETHYLENE POLYMER
Donald E. Sargent, 901 Meadow Lane,
Schenectady, N.Y. 12309
No Drawing. Filed Sept. 11, 1967, Ser. No. 666,952
Int. Cl. C08g *37/04*
U.S. Cl. 260—29.1                     7 Claims

ABSTRACT OF THE DISCLOSURE

Thermoplastic resinous compositions characterized by improved melt flow which comprise an oxymethylene polymer, e.g., a copolymer of trioxane and ethylene oxide, having inextricably incorporated therein a silicone oil, e.g., one represented by the structural formula $$(R')_3Si(OSi(R'')_2)_nOSi(R''')_3$$

wherein R', R'' and R''' are alkyls of from 1 to 3 carbon atoms, and $n$ is an integer of from 4 to 100.

---

This invention relates to oxymethylene polymers and more particularly to oxymethylene polymers which are modified with silicone oils or intermediate molecular weight polysiloxanes to improve the melt flow of the polymer.

Oxymethylene polymers having successive oxymethylene groups can be prepared by the polymerization of trioxane of formaldehyde. Oxymethylene polymers so produced are normally thermoplastic materials and have a unique combination of stiffness, toughness, and inertness which has resulted in their widespread use in molded or extruded objects. The molding or extruding operations require a material with sufficient melt flow to allow fast, uniform dispersion and distribution of the polymeric material throughout the cavity of the mold. However, due for the most part to the order in which the oxymethylene units are arranged and the alternating presence of methylene hydrogen and ether oxygen atoms, the probability of hydrogen bonding is very high resulting in a material of rather sharp crystalline melting point and a high viscosity in the melt. While it is true that the hydrogen bonding is less in the melt due to changes in the crystalline structure of the polymeric material, enough bonding remains between the chains to give a very viscous material causing some difficulty in molding and extruding.

Accordingly, the primary object of the present invention is to provide a modified oxymethylene polymer composition having improved melt flow properties. Other objects, as well as the scope, nature and utilization of the invention, will become apparent from the following description and appended claims.

In general, the objects of the present invention are accomplished by (A) mixing oxymethylene polymers with a silicone oil which is taken from the group consisting of (1) those having recurring siloxane groups according to the following linear structural formula:

$$(R')_3Si(OSi(R'')_2)_nOSi(R''')_3$$

wherein R', R'' and R''' are alkyls of from 1 to 3 carbon atoms and $n$ is an integer of from 4 to 100 or more; and (2) those having a cyclic structure corresponding to the following formula:

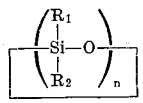

wherein $R_1$ and $R_2$ are alkyls of from 1 to 3 carbon atoms, and $n$ is an integer of 4 to 100 or more; and (B) adding a strong alkali as a catalyst to the mixture whereby the siloxane bonds of the silicone oil are attacked, opened and thereafter caused to form ring structure around the oxymethylene chains so that when subjected to extraction processes the siloxanes so attached are inextricably bound to the oxymethylene polymer.

Suitable oxymethylene polymers useful in this invention include homopolymers and copolymers. Preferred oxymethylene copolymers are those containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is, those which are free of interfering functional groups and do not induce undesirable reactions under the conditions involved. Particularly preferred are copolymers which contain from 60 to 99.6 mol percent of recurring oxymethylene groups and from 0.4 to about 40 mol percent of —OR— groups. Most preferred are those polymers having from 85 percent to 99.6 mol percent of recurring oxymethylene groups and from 0.4 to 15 mol percent of —OR— groups. In a preferred embodiment R may be, for example, an alkylene or substituted alkylene group containing at least two carbon atoms.

Among the oxymethylene copolymers which may be utilized in accordance with this aspect of the invention are those having a structure comprising recurring units having the formula

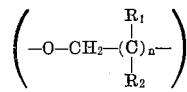

wherein $n$ is an integer from zero to 5 and wherein $n$ is zero in from 60 to 99.6 mol percent of the recurring units. $R_1$ $R_2$ are inert substituents, that is, substituents which are free of interfering functional groups and will not induce undersirable reactions.

A preferred class of oxymethylene copolymers are those having a structure comprising oxymethylene and oxyethylene recurring units wherein from 60 to 99.6 mol percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane or formaldehyde with a cyclic ether having the structure

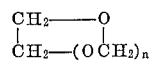

where $n$ is an integer from zero to 2.

Examples of preferred oxymethylene polymers include copolymers of trioxane and cyclic ethers containing at least two adjacent carbon atoms such as the copolymers disclosed in U.S. Patent No. 3,027,352 by Cheves T. Walling, Frank Brown and Kenneth W. Bartz, assigned to the Celanese Corporation.

Among the specific cyclic ethers which may be used are ethylene oxide; 1,3-dioxolane; 1,3,5-trioxepane; 1,4-dioxane; trimethylene oxide; pentamethylene oxide; 1,2-propylene oxide; 1,2-butylene oxide; neopentyl formal; pentaerythritol diformal; paraldehyde; tetrahydrofuran and butadiene monoxide.

As used in the present invention, the term "oxymethylene" includes substituted oxymethylene, where the substituents are inert with respect to the reactions in question, that is, the substituents are free of interfering functional groups and will not introduce undesirable reactions.

As used in the present invention, the term "copolymer" means polymers having two or more monomeric groups including terpolymers and higher polymers. Suitable oxymethylene terpolymers include those disclosed in U.S. patent application Ser. No. 444,787, filed Apr. 1, 1965, by W. E. Heinz and F. B. McAndrew, which is assigned to the Celanese Corporation.

The preferred oxymethylene polymers which are used in the present invention are thermoplastic materials having a melting point of at least 150° C. and are normally millable at a temperature of 200° C. They have a number average molecular weight of at least 10,000. These polymers have a high thermal stability. The preferred oxymethylene polymers which are used herein have an inherent viscosity of at least one (measured at 60° C. in a 0.1 weight percent solution in p-chlorophenol containing 2 weight percent of α-pinene). The preferred oxymethylene copolymers exhibit remarkable alkaline stability. For example, if the chemically stabilized copolymers are refluxed at a temperature of about 142 to 145° C. in a 50 percent solution of sodium hydroxide in water for a period of 45 minutes, the weight of the copolymer will be reduced by less than one percent.

The preferred oxymethylene copolymers are preferably stabilized by degradation of the molecular ends to a point where a stable carbon-to-carbon linkage exists at each end.

Thermal degradation, as disclosed in U.S. Patent 3,103,499, issued on Sept. 10, 1963 to Thomas J. Dolce and Frank M. Berardinelli, or degradation by hydrolysis, as disclosed in U.S. Patent 3,219,623, issued Nov. 23, 1965 to Frank M. Berardinelli may be used. These applications are assigned to the Celanese Corporation.

Other suitable oxymethylene polymers and methods of preparation therefor are disclosed in an article, Kern et al. Angewandte Chemie 73(6) 177–186 (Mar. 21, 1961), including polymers containing repeating carbon-to-carbon single bonds in the polymer chain as a result of copolymerizing trioxane with cyclic ethers such as dioxane, lactones such as beta-propiolactone, anhydrides such as cyclic adipic anhydride and ethylenically unsaturated compounds such as styrene, vinyl acetate, vinyl methyl ketone, acrolein, etc. Also these and other oxymethylene polymers are disclosed by Sitting in Petroleum Refiner, vol. 41, No. 11, November 1962, pages 131 through 170.

In addition to the above-mentioned oxymethylene copolymers, oxymethylene homopolymers of trioxane or formaldehyde may also be used in the present invention. It may be desirable to "end cap" the homopolymer molecules by the known methods of etherification or esterification.

Silicone oils are organosiloxane polymers which are commercially available in a range of viscosities from 0.65 to over 1,000,000 centistokes. For purposes of this invention silicone oils with viscosities of between 0.65 and 1000 centistokes and specific gravities of 0.94 to 0.98 are preferred. They may contain both linear and cyclic structures, comprising approximately 4 to 100 or more siloxane units. Dimethyl siloxane units are preferred, usually end capped in the linear structure with trimethylsiloxy groups.

The amount of silicone oils used in the invention may vary from about 0.5 to about 15% based on the weight of oxymethylene polymer used.

Any strong alkaline substance may be used, either in powdered form or in liquid solution. The dry powdered form is preferred. Illustrative examples of such strong alkaline substances include calcium hydroxide, barium hydroxide, sodium hydroxide, potassium hydroxide, sodium carbonate, potassium carbonate, etc. Amounts of from about 0.25 to 2 weight percent based on the weight of oxymethylene polymer may be added to the mixture.

The reaction may be run at temperatures within the range of 170–220° C., but preferably within the range of 180 to 200° C. until the melt index of the polymer is substantially increased. This usually requires a reaction time of from 5 to 60 minutes. After the desired degree of modification is achieved any unreacted silicone oil and the alkaline catalyst may be extracted from the mixture by means of the conventional extraction methods utilizing solvents such as water, alcohols, toluene, benzene, cyclohexane, n-heptane, etc. The reaction is generally conducted under atmospheric pressure conditions although super atmospheric pressure may be used if desired.

The following examples will further illustrate the invention.

EXAMPLE 1

Melt flow of silicone oil modified oxymethylene polymer

Forty grams of a commercial oxymethylene copolymer of trioxane and ethylene oxide was mixed in a plastograph at 190° C. with 2 grams of a commercial silicone oil (Dow Corning, DC–550) and 0.5 gram of powdered sodium hydroxide was added. The mixing continued in separate experiments for 10, 30 and 60 minutes respectively after which the residual sodium hydroxide and silicone oil were removed by consecutive extraction with water and with toluene in a Soxhlet extractor. The resulting product was placed in a vessel heated to a temperature of 190° C. having a small aperture at the bottom. Weights were placed on the polymeric substance forcing the material out of the aperture, the amount appearing being weighed as an indication of melt flow. Additional tests were conducted using varying amounts and reaction times.

The following results show that the mixtures containing relatively large amounts of silicone oil (tests 1, 2, 3 and 4) had markedly higher melt index than those containing small amounts of the silicone oil (tests 5, 6 and 7).

TABLE I

|  | Test | | | | | | |
| --- | --- | --- | --- | --- | --- | --- | --- |
|  | 1 | 2 | 3 | 4 | 5 | 6 | 7 |
| Oxymethylene copolymer [a], grams | 40 | 40 | 40 | 40 | 45 | 45 | 45 |
| Silicone oil [b], grams | 5 | 5 | 5 | 5 | 2 | 1 | 0.23 |
| Sodium hydroxide, grams | 0.5 | 0.5 | 0.5 | 0 | 0.2 | 0.1 | 0.23 |
| Silicone oil, percent | 11 | 11 | 11 | 11 | 4.2 | 2.2 | 0.5 |
| Mixing time after NaOH addition, min | 10 | 30 | 60 | [e] 60 | 10 | 10 | 10 |
| Melt Index [c], grams: | | | | | | | |
| 1x [f] | 14.5 | 14.8 | 12.3 | 54 | 12.5 | 12.2 | 916 |
| 10x | 2,430 | 1,370 | 1,610 | 2,960 | 1,367 | 870 | 265 |
| 10x/1x | 168 | 92 | 131 | 55 | 109 | 71 | 28 |
| $K_D$ 230 [d] | .098 | .053 | .048 | .075 | .034 | .033 | .049 |

[a] Celcon ® M-90, Celanese Corporation.
[b] DC-550, Dow Corning Corp.
[c] After extraction with $H_2O$ and toluene in Soxhlet extractor.
[d] Rate of decomposition at 230° C.
[e] Sodium hydroxide was not added. However, the silicone oil and oxymethylene copolymer were mixed for sixty minutes.
[f] Weight indications, e.g. 1x=1 gram weight.
® Trademark, acetal copolymer.

EXAMPLE 2

Melt flow comparison of modified with unmodified oxymethylene polymer 40 grams of a commercial oxymethylene copolymer of trioxane and ethylene oxide was mixed in a plastograph at 190° C. with 0.88 gram of a commercial silicone oil (Dow Corning DC-550) and 0.08 gram of powdered sodium hydroxide was added. Mixing continued for 60 minutes.

The resulting product was tested in a melt flow testing device such as described in Example 1. A similar amount of the original unmodified oxymethylene polymer material was also tested in such a melt flow testing device for comparison.

The comparative results in Table II below show a marked increase in the melt flow properties of the modified oxymethylene polymer over the unmodified polymer.

TABLE II

| | Unmodified oxymethylene copolymer | Silicone modified oxymethylene copolymer |
|---|---|---|
| Melt-Index, grams: | | |
| 1x | 9.3 | 9.6 |
| 10x | 156 | 643 |
| 10x/1x | 17 | 67 |

The principle, preferred embodiments, and modes of operation of the present invention have been described in the foregoing specification. However, it should be understood that the invention which is intended to be protected herein may be practiced otherwise than as described without departing from the appended claims.

The embodiments of the invention in which an exclusive property or privilege is claimed are defined as follows:

1. A process for making an oxymethylene polymer composition possessing improved melt flow which comprises mechanically intimately mixing the oxymethylene polymer with 0.5 to 15% based on the weight of oxymethylene polymer with line 4 to the end of the claim has been canceled and of a silicone oil selected from the group consisting of:

(A) a linear structure having the formula $$(R')_3 Si(OSi(R'')_2)_n OSi(R''')_3$$

wherein R', R'' and R''' are alkyls of from 1 to 3 carbon atoms and $n$ is an integer of from 4 to 100, and (B) a cyclic structure according to the formula

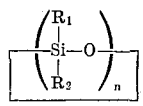

wherein $R_1$ and $R_2$ are alkyls of from 1 to 3 carbon atoms and $n$ is an integer of from 4 to 100; in the presence of from 0.25 to 2 weight percent of a strong alkali at a temperature below the decomposition temperature of the polymer and between about 170° and 220° C. until the melt index of polymer is substantially increased.

2. The process according to Claim 1 wherein the silicone oil is a linear structure of the formula:

$$(R')_3 Si(OSi(R'')_2)_n OSi(R''')_3$$

wherein R', R'' and R''' are alkyls of from 1 to 3 carbon atoms and $n$ is an integer of from 4 to 100, and the strong alkali is powdered sodium hydroxide.

3. A process according to claim 1 wherein the components are mixed at a temperature between 170 and 220° C. and wherein unreacted silicone oil and alkali are extracted from the mixture after the desired degree of modification is reacted.

4. The process according to claim 1 wherein the oxymethylene polymer has a melting point of at least 150° C.

5. A thermoplastic composition characterized by its improved melt flow qualities comprising an oxymethylene polymer having inextricably incorporated therein a silicone oil and produced by the process of claim 1.

6. The composition of claim 5 wherein the oxymethylene polymer is a copolymer containing from 60 to 99.6 mol percent of recurring oxymethylene groups.

7. The composition of claim 5 wherein the oxymethylene copolymer comprises combined trioxane and ethylene oxide.

References Cited

UNITED STATES PATENTS

| 3,243,409 | 3/1966 | Kornicker et al. | 260—824 |
| 3,419,653 | 12/1968 | Briggs et al. | 260—824 |

SAMUEL H. BLECH, Primary Examiner

U.S. Cl. X.R.

260—824

PO-1050
(5/69)

UNITED STATES PATENT OFFICE
CERTIFICATE OF CORRECTION

Patent No. 3,491,048            Dated January 20, 1970

Inventor(s) Donald E. Sargent

It is certified that error appears in the above-identified patent and that said Letters Patent are hereby corrected as shown below:

In Claim 1, lines 5 and 6 after the word "polymer", delete the phrase "with line 4 to the end of the claim has been canceled and".

SIGNED AND
SEALED
JUL 14 1970

(SEAL)
Attest:

Edward M. Fletcher, Jr.
Attesting Officer

WILLIAM E. SCHUYLER, JR.
Commissioner of Patents